United States Patent [19]
Belka

[11] Patent Number: 4,708,665
[45] Date of Patent: Nov. 24, 1987

[54] ENVIRONMENTALLY PROTECTED ELECTRICAL CONTACT TERMINAL ARRANGEMENT FOR A PLASTIC-METAL-PLASTIC LAMINATED CYCLE FENDER

[75] Inventor: Heinrich Belka, Bielefeld, Fed. Rep. of Germany

[73] Assignee: ESGE-Marby GmbH & Co. KG, Bielefeld, Fed. Rep. of Germany

[21] Appl. No.: 740,559

[22] Filed: Jun. 3, 1985

[30] Foreign Application Priority Data

Jun. 6, 1984 [DE] Fed. Rep. of Germany ....... 3420960

[51] Int. Cl.$^4$ .................... H01R 13/415; H01R 13/42
[52] U.S. Cl. .................................. 439/551; 439/736; 439/737
[58] Field of Search ............ 339/130 R, 130 C, 219 R, 339/220 R, 220 A, 220 C, 220 L, 220 T, 221 R, 221 L, 221 M, 126 RS, 94 A; 439/271–273, 277, 551, 559, 733, 736–739, 751

[56] References Cited

U.S. PATENT DOCUMENTS

| | | | |
|---|---|---|---|
| 2,456,118 | 12/1948 | Foster | 339/94 A |
| 2,552,686 | 5/1951 | Melcher | 339/130 C |
| 2,666,805 | 1/1954 | Smith | 339/94 A |
| 2,962,691 | 11/1960 | Mande et al. | 339/221 L |
| 3,200,366 | 8/1965 | Stuart | 339/130 C |
| 3,277,423 | 10/1966 | Rose | 339/130 C |
| 3,292,132 | 12/1966 | Murphy | 339/221 R |
| 3,525,088 | 8/1970 | Thummel | 339/97 R |
| 3,747,206 | 7/1973 | Pease | 339/130 R |
| 3,810,054 | 5/1974 | Nelson | 339/126 RS |
| 3,810,073 | 5/1974 | Zajac et al. | 339/130 C |
| 3,876,277 | 4/1975 | Colwell | 339/130 C |
| 4,050,772 | 9/1977 | Birnholz et al. | 339/220 R |
| 4,103,134 | 7/1978 | Urgero | 339/221 M |
| 4,110,904 | 9/1978 | Johnson | 339/220 R |

*Primary Examiner*—Gil Weidenfeld
*Assistant Examiner*—Gary F. Paumen
*Attorney, Agent, or Firm*—Frishauf, Holtz, Goodman & Woodward

[57] ABSTRACT

The invention proposes an electrical contact terminal arrangement for cycle fenders constructed from a molded multi-layer laminate of plastic with at least one metal foil layer embedded therein. The arrangement includes a metal head having a substantially flat underside which is pressed against an outer surface of the fender. A shaft-like projection is formed onto the underside of the head, extending at right angles to the underside and when mounted penetrating the fender. An attachment means anchored on this projection secures the contact terminal arrangement in the cycle fender.

In order to attain long service life of the contact location between the metal foil and the contact arrangement projection, and to attain low transitional resistance, only one shaft-like projection is provided, disposed concentrically with the head. A large number of contact protrusions is embodied on the outer circumference of the shaft-like projection, extending in the longitudinal direction thereof. The attachment arrangement likewise concentrically surrounds the shaft-like projection.

20 Claims, 5 Drawing Figures

ENVIRONMENTALLY PROTECTED ELECTRICAL CONTACT TERMINAL ARRANGEMENT FOR A PLASTIC-METAL-PLASTIC LAMINATED CYCLE FENDER

Reference to related publication, the disclosure of which is hereby incorporated by reference: U.S. Pat. No. 3,525,088 corresponding to German Patent No. 16 80 844.

The present invention relates to an electrical contacting arrangement for a cycle fender, particularly a bicycle fender or mud guard, which is a molded multi-layer laminated structure of plastic in which a metal strip is embedded.

BACKGROUND

Cycle fenders in which a metal foil or metal strip is embedded between plastic layers, molded in the form of the bicycle fender, have been previously proposed - see the referenced U.S. Pat. No. 3,525,088 to which German Patent No. 16 80 844 corresponds. Terminals for such an arrangement, to provide for electrical connection to the metal strip embedded in the plastic, usually use a circular flat disk with sawtooth projections therefrom, which extend at right angles from the bottom side of the disk.

With these projections at the forefront, the contacting arrangement is pressed into the fender during assembly. Then the tips of the projections protruding from the other side of the fender are riveted over toward the inside or the outside, in order to hold the contacting arrangement securely in the fender.

The projections passing through the fender are intended here to make electrical contact with the metal foil, which is embedded completely between two layers or strips of plastic, in order to supply current for the electrical equipment disposed on or near the fender, such as the headlights and/or taillights, without using cables. The structure of this fender is described in detail in U.S. Pat. No. 3,525,088 corresponding to German Patent No. 16 80 844.

However, it has been found in the course of time that this inherently rather advantageous contacting arrangement exhibits constantly increasing transitional resistance, after a relatively long period in use, between the projections and the metal foil of the fender, to the point of complete interruption of the electrical current.

THE INVENTION

It is an object to improve an electrical terminal contact arrangement for a laminated cycle fender such that it has decreased transitional resistance with the metal foil and retains this feature for a significantly longer period of time even under adverse weather conditions.

Briefly, a single shaft-like projection is provided, which extends concentrically with both the head and the attachment means and is formed at the outside with longitudinal contact projections. This achieves sealing for the contact location between the shaft-like projection and the metal foil, because of the bearing surfaces of the head and attachment means on the outer plastic surface of the fender. Sources of corrosion, such as moisture and salt water, are effectively kept from reaching the contact location. The many protrusions extending from the outer circumference of the shaft-like projection, on the other hand, provide a large number of contact locations between the shaft-like projections and the metal foil, even if one or another contact location between a shaft-like projection and the metal foil should be satisfactory from the outset or should become impaired in time. Taken together, all the provisions of the invention result in substantially greater reliability and a substantially longer life for the electrical contact terminal arrangement.

A particularly reliable electrical connection between the contact protrusions and the metal foil is obtained if these protrusions are embodied with sharp edges, because then, when the contacting arrangement is pressed into the correspondingly prepared opening, having close tolerances, in the cycle fender, any poorly conductive oxide layer adhering to the metal foil can be broken through. A very great number of electrically effective protrusions can be attained if the shaft-like projection has a circular cross section, at least in the vicinity of the contact protrusions, and if the protrusions themselves are embodied by a ribbing or knurling. The ribbing or knurling has the further advantage that together with the plastic layer of the fender, it forms a means of preventing twisting of the contacting arrangement, because the teeth of the knurling also penetrate the plastic, which has a much greater mechanical strength than does the thin metal foil, which is generally of aluminum.

Exemplary embodiments of the invention are shown in the drawing and explained below.

DRAWING:

FIG. 1, partly in longitudinal section, shows an electrical contact terminal arrangement according to the invention, inserted into a portion of a cycle fender and provided with a knurl or ribbing and an outer thread;

DETAILED DESCRIPTION

Figure 1:
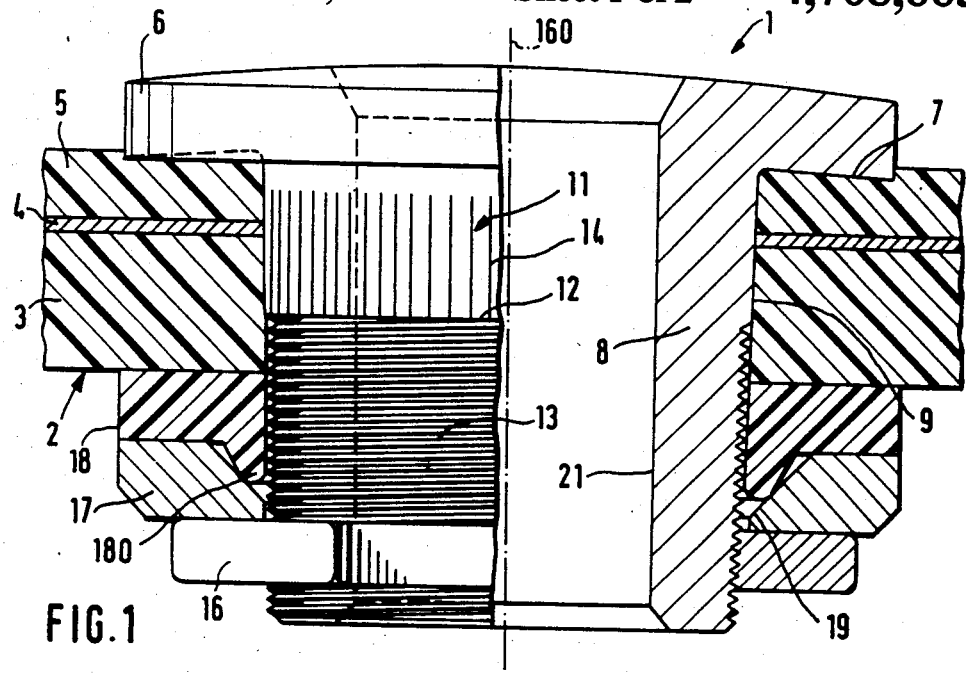

In FIG. 1, an electrical contact terminal arrangement 1 is shown for a cycle fender 2, shown in part, of a bicycle not otherwise shown. Cycle fenders of this kind are known by the name "Chromoplastics" (TM), and their structure and manufacture are desribed in U.S. Pat. No. 3,525,088 hereby incorporated by reference.

The cycle fender comprises three layers one above one another in sandwiched fashion, namely a lower plastic layer 3 facing the wheel itself, a thin metal foil layer 4 located above it, and finally a further layer of plastic 5 located above the metal foil 4. The two plastic layers 3 and 5 completely surround the metal foil 4, which is approximately 0.05 to 0.1 mm thick and is conventionally of aluminum.

The contacting arrangement 1 serves to provide an electrical connection with the metal foil 4 embedded between the plastic layers 3 and 5, so as to obtain a cable-free means of supplying electrical current to electrical equipment secured to the cycle fender.

The contacting arrangement 1 includes a flat, disklike hed 6 of circular cross section, the underside 7 of which, facing the plastic layer 5, is embodied as concave, as shown. A shaft-like projection 8 protrudes in one piece from the underside 7 of the head 6 and, as shown in FIG. 1, extends in the assembled state through a corresponding opening 9 in the fender 2. The head 6 and the projection 8 are both made of metal.

The shaft-like projection 8, which extends coaxially with and at right angles to the head 6, has an axial knurl or ribbing 11 at its portion adjoining the underside 7 of the head 6; this knurl or ribbing 11 merges with an outer thread 13 at a region 12. The outer diameter of thread 13, as shown, is smaller than the outer diameter of the knurl or ribbing 11. The height of the knurl or ribbing 11 is less than the overall thickness of the fender 2, which is in the range from 1.5 to 2.5 mm.

Because of the knurl or ribbing 11, a large number of fine protrusions or teeth 14, having sharp edges and extending beyond the outer circumference of the projection 8 and through the metal foil 4, is created on the shaft-like projection 8. The teeth 14, resulting from the simple straight knurling 11 extend parallel to the longitudinal axis 20 of the contacting arrangement 1, as shown.

To prevent the metal foil 4 from being punched out by the end faces of teeth 14 embodied by the knurling 11 when the contacting arrangement 1 is inserted into the opening 9, the teeth 14 of the knurling 11, in a region 15 (FIG. 2) adjacent to the outer thread 13 and approximately 0.1 mm in height, form an imaginary truncated cone, the small diameter of which corresponds to the outer diameter of the outer thread 13 and the large diameter of which is equal to the outer diameter of the knurl or ribbing 11. The outer diameter of the knurl or ribbing 11 is preferably larger, by approximately 0.1 to 0.2 mm, than the outer diameter of the outer thread 13, which amounts to approximately 4 mm.

A nut 16 screwed onto the outer thread 13 of the shaft-like projection 8 serves to attach and retain the contacting arrangement 1 in the cycle fender 2. With this nut 16, a washer 17 is pressed, via an interposed soft sealing disk 18 which is plastically or elastically deformable, against the outside of the plastic layer 3. The center bore 19 of the plane parallel washer 17 is conical in shape, with its larger diameter oriented toward the sealing disk 18 in order to attain effective sealing of the outer thread 13, which is embodied as a fine pitch thread; this sealing is effected by material comprising the sealing disk 18 entering into the bore 19. The sealing effect can be increased still further if the sealing disk 18 includes an annular bead 180, extending concentrically around its center bore 19; as shown, this bead 180 extends into the conical center bore 19 of the non-deformable, preferably metal washer 17, so that even with slight axial forces, the bead 180 is pressed by the oblique wall of the center bore 19 against the outer circumference of the shaft-like projection 8. To reliably prevent the sealing disk 18 from resting in a hollow in its middle region, it is suitable for the surface of the sealing disk 18 facing the plastic layer 3 to be pre-molded in a convex shape.

Figure 4:
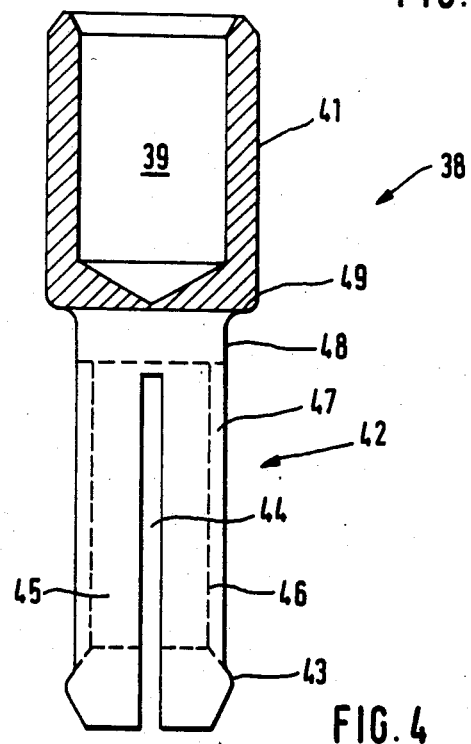
FIG. 4, partly in longitudinal section, shows a plug which is suitable for the electrical contact terminal arrangements shown in FIGS. 1-3, collectively.

Since the electrical contact terminal arrangement 1 shown serves as a socket for a contact plug shown in FIG. 4, it includes a cylindrical through bore 21, which is coaxial with the shaft-like projection 8 and penetrates all the way through the contacting arrangement 1.

Assembly and formation of the contact terminal:

The contact terminal arrangement 1 is mounted on the cycle wheel fender 2 such that, first, the opening 9 is produced in the fender 2, for instance by punching. The inside diameter of the opening 9 is slightly larger than the outer diameter of the thread 13, but notably smaller than the outer diameter of the knurling 11, in order to facilitate insertion of the contacting arrangement 1. The contacting arrangement 1 can now be readily inserted into the thus-prepared opening 9 until the frustoconical section 15 of the knurling 11 rests on the outer rim of the opening 9. If the contacting arrangement is now pressed in further, using increased force, then because of the frustconical section 15 the plastic layer 5 is gradually pressed aside radially, with respect to the longitudinal axis 20, such that no plastic, or as little as possible, of the plastic layer 5 is carried along by the teeth 14 of the knurling 11 in the direction of insertion of the contacting arrangement 1. In the course of the insertion by pressure of the contacting arrangement 1, the frustoconical section 15 finally arrives at the metal foil 4, which is thereupon likewise pressed gradually laterally or radially aside, relative to the longitudinal axis 20, because in the frustoconical region 15 the teeth 14 gradually rise to their full height from the outer diameter of the thread 13.

Finally, the knurling 11 also forces its way partly into the lower plastic layer 3, because the axial extension of the knurling 11 is dimensioned such that its end face 12, when the contact terminal arrangement 1 is pressed all the way in, comes to rest inside the lower plastic layer 3.

Because of this configuration, the metal foil 4, which has only slight elasticity itself, is pressed from the two adhering plastic layers 3 and 5, which have a greater ability to rebound, against the teeth 14 of the knurling 11. Because the knurl 11 has sharp edges, any possible oxide layer on the metal foil 4 is reliably broken through, and a very large number of contact locations between the shaft-like projection 8 and the metal foil 4 is produced. The contact protrusions can be formed by corners of a polygon.

Finally, with the interposed elastic sealing disk 18 and the washer 17, the nut 16 is screwed on and tightened, causing the sealing disk 18 to be squeezed and to flow into the conical center opening 19 and into the thread courses in the thread 13 in this region, thereby effectively sealing the thread 13. Furthermore, sealing off from the underside of the plastic layer 3 is attained as well, so that the contact location between the shaft-like projection 8 and the metal foil 4 located in the opening 9 is effectively sealed off from that direction.

The tightening of the nut 16 also pulls the contact terminal arrangement 1 more firmly into the opening 9 of the fender 2, however, causing the outer edge of the concave underside 7 as well to rest in a sealing manner against the outside of the plastic layer 5. As a result, the contact location between the shaft-like projection 8 and the metal foil 4 is sealed off from the other direction as well, and no moisture or salt water can reach the contact location.

When the nut 16 is tightened, the protrusions or teeth 14 of the knurl or ribbing 11 simultaneously prevent the shaft-like projection 8 from rotating as well in the opening 9, so that it becomes possible to dispense with complicated tools for firmly holding the head 6 in place.

Figure 2:
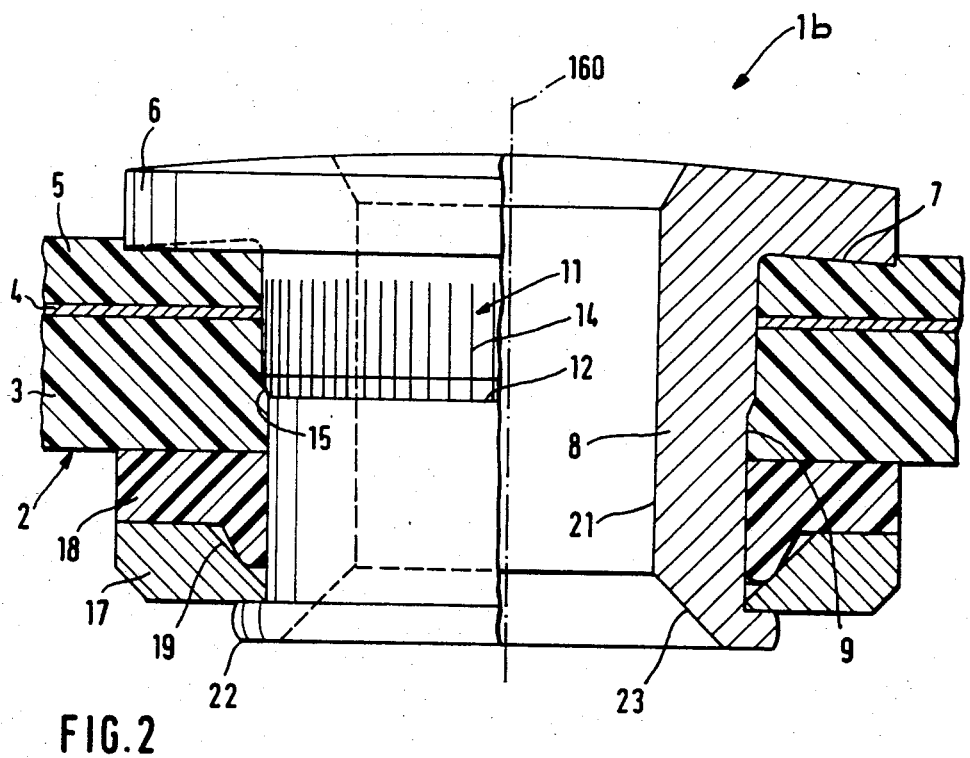
FIG. 2 is a view and an embodiment of an electrical contact terminal arrangement according to the invention, similar to what is shown in FIG. 1, in a riveted arrangement.

A further exemplary embodiment of the contact terminal arrangement is shown in FIG. 2, differing from that shown in FIG. 1 only in terms of how the attachment arrangement, which in the case of FIG. 1 was embodied by the outer thread 13 and the nut 16 srewed onto it, is embodied. The same reference numerals as in FIG. 1 are therefore used for corresponding components of the contacting arrangement of FIG. 2, and such components will accordingly not be described again.

The contacting arrangement 1b of FIG. 2 again includes a shaft-like projection 8 coaxial with the head 6, which has a knurl or ribbing 11 in its region adjacent to the underside 7; the axial extension of the knurl 11 is approximately one-half to three-quarters the thickness of the cycle fender 2. The portion of the projection 8 adjacent to the knurl 11 is embodied as a smooth-walled cylinder, however, the outer diameter of which is smaller than the outer diameter of the knurl 11.

The contacting arrangement is attached and secured by riveting the free end of the shaft-like projection 8, thereby producing the riveted-over head 22 shown in FIG. 2. The head 22 presses the washer 17, as in the foregoing embodiment, against the sealing disk 18, which then flows.into the conical center opening 19.

Although if the work is performed carefully the seam between the washer 17 and the riveted-over head 22 is inherently tight, the sealing disk 18 is nevertheless recommended, since as a rule, because of the shape of the cycle fender 2, the outside of the plastic layer 3 is curved about two axes with different radii of curvature, and without the sealing disk 18 it would be possible under some circumstances for leaks to occur between the washer 17, which is required during riveting, and the underside of the plastic layer 3.

In order to facilitate the formation of the riveted-over head 22, the shaft-like projection 8 is countersunk at its end remote from the head 6.

Otherwise, the dimensions and manner of assembly are the same as in the exemplary embodiment of FIG. 1.

In FIG. 3—collectively—two further exemplary embodiments of the contacting arrangement, 1c and 1d, are shown. The contacting arrangement 1c and 1d here comprises a hollow or tubular rivet 30, having a rivet head 31 and an adjacent cylindrical, tubular shaft 32. The riveting head 31 is beaded or flanged outward by 180° with respect to the shaft 32, thereby forming the head of the contacting arrangement 1c and including an annular groove 33 extending about the shaft 32, while the shaft-like projection 8 comprises the shaft 32 itself.

Figures 3A, 3B:
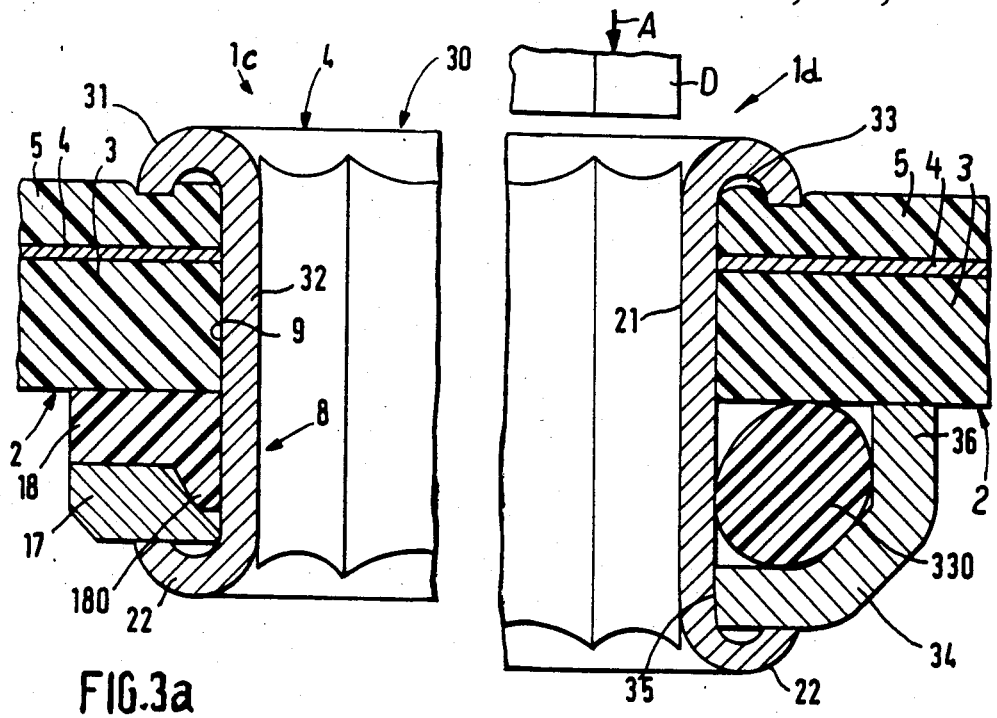
FIG. 3a is a longitudinal section of an electrical contact terminal arrangement according to the invention embodied as a hollow rivet with a polygonal projection, shown with a sealing arrangement.
FIG. 3b is an arrangement as shown in FIG. 3a, but illustrating a different sealing arrangement.

The anchoring of the contacting arrangement 1 in the cycle fender 2 is effected as in FIG. 2, by riveting and forming a riveted-over head 22; otherwise the same provisions for effecting sealing are made in the embodiment of FIG. 3a as are shown in the foregoing figures. The same reference numerals are again used for components that are the same as in the foregoing figures.

The contacting arrangement 1 shown in FIG. 3—collectively—is mounted as follows:

After the opening 9 has been made, again by forming a hole, for instance by punching, the hollow rivet 30 provided with the rivet head 31 is inserted into the opening 9 with its shaft 32, which initially is still cylindrical and which forms the projection 8. To this end, the opening 9 has an inside diameter slightly larger than the outside diameter of the projection 8, so that no plastic material is carried away from the end of the projection 8 remote from the rivet head 31. Once the contacting arrangement has been inserted into the cycle fender 2, the sealing disk 18 and the washer 17 are put in place and the head 22 is closed by being riveted over, as of result of which, first, the outer edge of the rivet head 31 is pressed into the plastic layer 5 and, second, the sealing disk 18 is squeezed between the plastic layer 3 and the washer 17. The interior is thereby effectively sealed.

Subsequently, a mandrel D (see FIG. 3b) having the cross section of a regular polygon, for instance a hexagon, is pressed into the opening 21 of the contacting arrangement 1c as symbolically indicated by the arrow A; that is, it is pressed into the shaft 32 of the hollow rivet 30 which has now been riveted over, as a result of which protrusions are created on the outside of the shaft-like projection 8 from expansion and deformation. These protrusions extend into the metal foil 4 and establish the desired electrical contact.

Instead of the substantially flat sealing disk 18 such as is shown in FIG. 3a, an O-ring 330 located in a chamber (see FIG. 3b) can also be used. To this end, an approximately cup-shaped cap 34 is located between the riveted-over head 22 and the plastic layer 3 of the cycle fender 2; with its center opening 35, the cap 34 is pushed onto the projection 8 and with its edge 36 extending approximately parallel to the projection 8, it points toward the plastic layer 3. A chamber in which the O-ring 330 is retained captive in a known manner is thereby created between the inside of the cap 34 and the outside of the projection 8, because the height of the chamber defined in the axial direction by the cap 34 is smaller than the thickness of the O-ring 330. In the mounted state, the O-ring 330 therefore rests in a sealing manner against the outside of the projection 8, the outside of the plastic layer 3 and the inner wall of the cap 34, and the cap 34 in turn is supported with its end face on the outside of the plastic layer 3.

The contacting arrangement 1, 1b, 1c, 1d as shown in various forms in the drawings comprises a corrosion-inhibiting or corrosion-free material, preferably special steel with the 4305 designation.

In FIG. 4, finally, a plug 38, also of special steel, is shown which is suitable for the contacting arrangment 1, 1b, 1c, 1d. The plug 31 has an upper cylindrical shaft portion 41, provided with a blind hole 39, and a plug portion 42 formed coaxially and integrally therewith and likewise having a circular cross section. The cylindrical plug portion 42 has a continuous annular bead 43 on its end remote from the shaft portion 41 and is slit longitudinally at 44. The slit 44 extends through the longitudinal axis of the plug 38 and enables a resilient compression of the thereby created jaws 45 and 46 whenever the bead 43 enters into the opening 21 of the contacting arrangement 1. A more resilient spring effect is attained if the plug portion 42 is provided, in the region between the bead 43 and the shaft portion 41, with a taper 47, as indicated by the broken line in the drawing. The taper 47 does not extend as far as the upper shaft portion 41, but instead a short cylindrical section 48 remains, the outer diameter of which corresponds to the inside diameter of the opening 21 of the contacting arrangement 1, in order to guide the plug reliably in the contacting arrangement 1. It will be understood that the length of the plug portion 42 is adapted to the axial length of the contacting arrangement 1 such that the bead 43 comes to rest in the cylindrical region of the bore 21 whenever the shoulder 49, formed between the plug portion 42 and the shaft portion 41, rests on the head 6. For easier insertion, the plug portion 42 can be taperred to a truncated cone at its free end.

The cable is secured in the blind hole 39 of the shaft portion 41 by soldering, welding or squeezing the shaft portion 41 closed.

The contact protrusions according to the invention may also be embodied by the corners of a polygon, such as a hexagon, which upon the insertion of the projection 8 into the prepared round opening in the fender 2 press into the metal foil 4. This embodiment also enables an originally circular tubular projection 8 to be used, which after the contacting arrangement 1 is mounted in the opening in the fender 2 is subsequently expanded into a polygonal shape by an appropriate tool. As a result, plastic material is reliably prevented from being dragged or smeared into the area between the projection 8 and the metal foil 4.

For reliable contacting and also to prevent twisting, it is entirely sufficient for the protrusions 14, measured in the longitudinal direction of the projection 8, to have a length that is shorter than the thickness of the fender 2, such that in the mounted state they terminate inside the fender 2. In particular, it is thereby possible to facilitate sealing in the area of the attachment means 16, 22, that is, on the end facing the head 6 of the contacting arrangement 1, because a seal adapted to the shape of the protrusions is not necessary any longer.

Dragging or smearing of plastic by the protrusions 14 as the contacting arrangement 1 is inserted is prevented if the protrusions 14 of the projection 8 define, on their end remote from the head 6, an imaginary truncated cone such that the protrusions 14 gradually rise, in a transitional area defined by the truncated cone and beginning at the outer circumference of the projection 8, to their full height above the outer circumference.

Sealing in the vicinity of the attachment means 16, 22 is improved if an additional sealing arrangement is provided, which is located between the attachment means and the surface of the fender 2 that is adjacent it, in the mounted state, the additional sealing arrangement concentrically surrounding the projection 8. Such a sealing arrangement may comprise a non-deformable washer 17, having a frustoconical center opening 19, and an elastically or plastically deformable sealing disk 18, which when the attachment means is tightened enters into the frustoconical center opening 19 of the washer 17 and thus seals off the gap existing between the projection 8 and the plastic of the cycle fender 2.

Another possible embodiment of the sealing arrangement has a cup-shaped cap which can be seated on the projection, and an O-ring 330 held captive in the inner chamber of the cap 34 between the cap and the projection 8. This type of sealing arrangement is particularly suitable in the case of a polygonal projection 8.

The tightness of the seal between the head 6 of the contacting arrangement 1 and the cycle fender 2 can be improved, especially in the case where the fender 2 is notably curved, by providing that the underside 7 of the head 6 be concave. Another possible means of attaining the same goal is to provide an annular groove 33, concentrically surrounding the projection 8, 32, in the underside 7 of the head 6. In either case, relatively sharp edges are therby formed, which press in a sealing manner into the soft, plastic outer surface of the fender 2.

An attachment means for the contacting arrangement which is very easily and economically manufactured is made by riveting. After the insertion of the contacting arrangement 1 into the corresponding opening 9 of the fender 2, the projection 8, 32 is riveted, with the above-mentioned sealing arrangements being interposed as needed. The corresponding riveted-over head 22 hereby forms the attachment and retaining means that is anchored on the projection 8, 32. For repair purposes, in contrast, it is more advantageous for the attachment and retaining means to be formed by an outer thread 13 of the projection and by a nut 16 that can be screwed onto this outer thread 13, because in that case subsequent mounting is readily possible without using complicated tools.

If the contacting arrangement 1 has a through bore 21 coaxially passing through the head 6 and the projection 8, 32, then a plug 38 can be used for further electrical connection, enabling electrical connection to be effected without screws.

The contacting arrangement 1 is realized particularly economically if it is manufactured in the manner of a hollow rivet 30, the head of the contacting arrangement being formed by the rivet head 31, which is shaped as needed as in the foregoing embodiments. In this case, the riveting during mounting of the contacting arrangement 1, in particular, becomes quite simple, and furthermore the opening 21 for the plug 38 is provided at the same time.

The contacting arrangement can be made more durable if it is made of a corrosion-resistant special steel, for example special steel carrying a 4305 designation.

I claim:

1. In combination with a plastic (3) - metal foil (4) - plastic (5) laminated cycle fender (2) formed with an opening therethrough, in which the metal foil is embedded in the plastic, said plastic defining a plastic top layer (5), and a plastic bottom layer (3); and wherein the metal foil (4) is positioned between said top and bottom layers, an environmentally protected electrical contact terminal arrangement to make a reliable electrical contact with the metal foil (4) which is embedded in and between said plastic layers (3, 5) and having a metallic head (6) formed with an underside (7) fitting against one outer plastic surface of one of said plastic layers of the fender (2) and forming a first bearing surface;

a shaft-like projection (8) extending at essentially a right angle to the underside of the metallic head and located in the opening of the fender;

an attachment and retaining means (16, 22), contrically surrounding the shaft-like projection (8, 32), secured to the projection (8, 32) and extending over and overlapping a second plastic outer surface of a second one of said plastic layers of the fender, opposite, with respect to the metal foil, of said one plastic layer and forming a second bearing surface, said metallic head and said attachment and retaining means being engaged against said outer plastic surfaces to clamp said terminal arrangement to the fender (2), wherein the shaft-like projection (8, 32) defines a contact location for electrical contact with the embedded metal foil (4), which contact location comprises a single cylindrical element of circular cross section, unitary with the head, the shaft-like projection being formed at its outside with a plurality of rib-like contact protrusions (14) extending generally axially along the shaft-like projection and projecting radially outwardly with respect to the circular cross section of the shaft-like projection to penetrate and engage said metal foil embedded between said plastic layers (3, 5).

2. Electrical contact terminal arrangement according to claim 1, wherein the contact protrusions (14) have sharp edges.

3. Electrical contact terminal arrangement according to claim 1, wherein the rib-like contact protrusions (14) are formed by a knurl or ribbing (11) with sharp edges.

4. Electrical contact terminal arrangement according to claim 1, wherein each of the rib-like contact protrusions (14) form a corner of a polygon.

5. Electrical contact terminal arrangement according to claim 1, wherein the rib-like contact protrusions (14) have a length, measured in the longitudinal direction of the shaft-like projection (8), which is less than the thickness of the cycle fender (2), to terminate inside the fender (2) when assembled in the combination of fender - terminal arrangement.

6. Electrical contact terminal arrangement according to claim 1, wherein the radially projecting rib-like contact protrusions (14) of the shaft-like projection (8), at their end (12) remote from the head (6), define an imaginary truncated cone (15), such that the contact protrusions (14) rise gradually, in a transition zone embodied by the truncated cone (15), to their full height beyond the outer circumference of the shaft-like projection (8), beginning at that outer circumference.

7. Electrical contact terminal arrangement according to claim 1, further including a sealing arrangement (17, 18, 33, 34), which is located between the attachment and retaining means (16, 22) and the adjacent surface of the fender (2) when combined with the fender and is positioned concentrically around the shaft-like projection (8, 32) in a sealing manner.

8. Electrical contact terminal arrangement according to claim 7, wherein the sealing arrangement has a non-deformable washer (17), having a conical center opening (19), and an elastically or plastically deformable sealing disk (18).

9. Electrical contact terminal arrangement according to claim 7, wherein the sealing arrangement has a cup-shaped cap (34), seated on the shaft-like projection (8, 32), and an O-ring (330) located in an inner chamber defined between the shaft-like projection (8, 32) and the cap (34).

10. Electrical contact terminal arrangement according to claim 1, wherein the underside (7) of the head (6) is concave in shape.

11. Electrical contact terminal arrangement according to claim 1, wherein the underside of the head (6) includes an annular groove (33) concentrically surrounding the shaft-like projection (8, 32).

12. Electrical contact terminal arrangement according to claim 1, wherein the attachment and retaining means is formed by an outer thread (13) of the shaft-like projection (8) and a nut (16) that can be screwed onto the outer thread (13).

13. Electrical contact terminal arrangement according to claim 1, wherein the attachment and retaining means is formed by a riveted-over head (22) which is produced after the insertion of the contact terminal arrangement (1) into the opening (9) of the fender (2) by riveting-over the shaft-like projection (8, 32).

14. Electrical contact terminal arrangement according to claim 1, wherein a through bore (21) is formed in the head, coaxially penetrating the head (6, 31) and the shaft-like projection (8, 32), for receiving a plug (38).

15. Electrical contact terminal arrangement according to claim 1, comprising a hollow rivet (30), the head (6) being embodied by the rivet head (31).

16. Electrical contact terminal arrangement according to claim 1, comprising a corrosion-resistant steel.

17. Electrical contact terminal arrangement according to claim 1, wherein the attachment and retaining means is formed by holding means (16, 22) secured to the shaft-like projection (8) and extending over the second plastic outer surface of the second one of said plastic layers of the fender.

18. Electrical contact terminal arrangement according to claim 10, comprising a hollow rivet (30) the head (6) being formed by the rivet head (31).

19. Electrical contact terminal arrangement according to claim 12, wherein a through bore (21) is formed in the head, coaxially penetrating the head (6, 31) and the shaft-like projections (8, 32), for receiving a plug (38).

20. Electrical contact terminal arrangement according to claim 12, comprising a corrosion-resistant steel.

* * * * *